United States Patent [19]

Merritt et al.

[11] 4,386,106

[45] May 31, 1983

[54] PROCESS FOR PREPARING A TIME DELAYED RELEASE FLAVORANT AND AN IMPROVED FLAVORED CHEWING GUM COMPOSITION

[75] Inventors: Carleton G. Merritt, Syracuse; Winston H. Wingerd, Camillus; David J. Keller, Weedsport, all of N.Y.

[73] Assignee: Borden, Inc., Columbus, Ohio

[21] Appl. No.: 326,188

[22] Filed: Dec. 1, 1981

[51] Int. Cl.³ .................. A23G 3/30; A23L 1/222; A23L 1/223

[52] U.S. Cl. .................. 426/5; 426/96; 426/98; 426/103; 426/534; 426/650; 426/651; 264/4.3

[58] Field of Search .................. 426/3-6, 426/103, 96, 534, 650, 651, 98; 252/316

[56] References Cited

U.S. PATENT DOCUMENTS

| | | | |
|---|---|---|---|
| 2,369,847 | 2/1945 | Olsen et al. | 426/651 |
| 2,876,160 | 3/1959 | Schoch et al. | 426/651 |
| 2,886,445 | 5/1959 | Rosenthal et al. | 426/651 |
| 2,886,446 | 5/1959 | Kramer et al. | 426/651 |
| 2,886,448 | 5/1959 | Kramer et al. | 426/651 |
| 3,795,744 | 3/1974 | Ogawa et al. | 426/3 |
| 3,819,838 | 6/1974 | Smith et al. | 426/651 |
| 3,826,847 | 7/1974 | Ogawa et al. | 426/3 |
| 3,857,964 | 12/1974 | Yolles | 426/3 |
| 3,920,849 | 11/1975 | Marmo et al. | 426/651 |
| 4,001,438 | 1/1977 | Marmo et al. | 426/651 |
| 4,276,312 | 6/1981 | Merritt | 426/651 |

*Primary Examiner*—Jeanette M. Hunter
*Attorney, Agent, or Firm*—George P. Maskas; Kenneth P. Van Wyck

[57] ABSTRACT

A method for preparing a controlled, delayed release encapsulated flavorant composition for use in chewable confections prepared by the steps of forming an emulsion of flavoring agent in a partially hydrophilic matrix material comprising gelatin, a natural gum and plasticizer; drying the emulsion to a solid matrix; grinding to a solid base powder; and then coating the base powder with a water insoluble material which will prevent elusion of flavor from the base powder and will not dissolve under the hydrolytic condition of the mouth to give a delayed flavor release and yet which, when chewed, will give a substantial flavor "burst" and sustained flavor release as the hydrophilic base powder matrix is wetted in the mouth. An improved variable flavor chewing gum composition containing a delayed release flavorant of the invention is also disclosed.

27 Claims, No Drawings

PROCESS FOR PREPARING A TIME DELAYED RELEASE FLAVORANT AND AN IMPROVED FLAVORED CHEWING GUM COMPOSITION

BACKGROUND OF THE INVENTION

The present invention relates to a method for preparing a delayed release encapsulated flavorant composition in solid particulate form for use in chewable compositions such as foods, confections and other orally utilized compositions, especially chewing gum, wherein the flavorant composition will provide both delayed release of flavor and release of a substantial flavor peak or "burst" of flavor with sustained release of substantially all of the encapsulated flavorant.

The invention further relates to a solid encapsulated and coated flavorant matrix containing ingredients such as an essential oil, spice, oleo resin and artificial flavorants containing substantially all of the relatively volatile flavor components or "low boilers" of flavorant, e.g. acetaldehyde and butylacetate, which are conventionally lost in preparation of prior art spray dried flavorant products.

The invention also relates to an improved controlled, variable flavored chewing gum composition prepared by incorporating the delayed release encapsulated flavorant of the invention, with or without conventional free oil flavorants, in a chewing gum base.

In particular, this invention is directed to a process for preparing water insoluble flavorants in a solid matrix of partially water soluble or hydrophilic encapsulation material comprising gelatin, a natural gum and plasticizer which provides for ready elusion of flavorant at substantial flavor peaks under the hydrolytic condition in the mouth and yet which is coated with a water insoluble material which provides for delayed release of substantially all of the flavorant without having flavor oil dissolve in the water insoluble coating or the gum base, which has produced flavor "chew-out" problems in prior art products.

Over the years, there has been a considerable amount of work in the field of flavorant compositions for use in orally chewable compositions such as medicines, toothpaste, tobacco and particularly chewing gum. Much of this work has been directed to the need for developing flavorants which will give a substantial initial flavor level or flavor burst and yet will give sustained release of flavor at interesting levels over an extended period of time.

Thus, it has long been recognized in the art that the addition of free flavor oil to gum bases, as is still conventionally practiced in the field, results in the release of only about 20–40% of the initial flavor upon chewing due to the fact that 60–80% of the initial flavor is entrapped or bound within the gum base and cannot be chewed out over an indefinite period of time.

In response to this problem, it has been long known in the art to seal or microencapsulate flavorants in colloids such as gum arabic, dextrin, starch and gelatin to prevent diffusion of the flavor oil into the gum base. Thus, for example, U.S. Pat. Nos. 1,526,039 and 2,369,847 teach the encapsulation of essential oils in emulsifying material, including common gums and gelatin, to prevent the flavor from escaping and having direct contact with the gum base.

U.S. Pat. Nos. 2,886,440; 2,886,445; 2,886,446; and 2,886,449 all describe flavors for chewing gum prepared by encapsulating flavor oil in gelatin by spray drying, coacervation, and gelatin hardening to obtain extended flavor perception time and obtain a high degree of flavor release.

More recent works in the field, as shown in U.S. Pat. Nos. 3,957,964 which describes thick or multiple coating of hardened gelatin; 3,920,849 and 4,001,438 which review encapsulation teachings with gelatin including mixture of free oil and gelatin encapsulated flavorants; and one of the Co-Applicant's own U.S. Pat. No. 4,276,312 which teaches spray drying of gum arabic, maltodextrins and hydrolyzed gelatin encapsulated flavor oil without loss of low boiler components of the oil, also are directed to achieving substantial release of flavor over an extended period of time without significant loss of flavor in the gum base.

More recently, considerable work has been directed to development of a delayed release flavorant which will give delayed release of flavorant and yet which will readily release a substantial amount of flavor over an extended period of time after conventional flavorants such as free oils are normally dissipated from the mouth by normal elusion with saliva. The obvious benefit of delayed release is the ability to give flavor variable chewing gum having distinct flavors not previously attainable by mere administration of conventional seasonings and flavor oils.

Prior art attempts at achieving delayed release have all relied upon the use of a coating or matrix of water insoluble material surrounding and in direct contact with the flavoring oil or spice being coated, which has attained diffusion of the flavorant into the insoluble material, such as polyvinyl acetate, proteins, gelatin or other high molecular weight natural and synthetic resins. Where these prior art processes have succeeded in achieving any degree of delayed release, which is not of the order of that achieved in the instant invention, it has been achieved at the expense of the problem of flavor chew-out of a substantial amount of flavor which has become dissolved or "fixed" in the insoluble coating matrix.

Thus, for example, in U.S. Pat. No. 3,795,744 a flavorant such as essential oils, sweeteners, spices, etc. has been encapsulated within a matrix or alternatively a coating of polyvinyl ester water insoluble material for delayed release of flavorant when the flavorant is uniformly distributed, together with a "quick release" i.e. commercially prepared flavorant, in a chewing gum base for variable flavor gums. This process, which is directed to achieving controlled flavor release, results in a substantial amount of flavor which cannot be "chewed-out" over an indefinite period of time and does not give a substantial flavor "burst" after a delayed period corresponding to the time when conventional flavors are dissipated in the mouth.

Similarly, a recent European Patent Application publication of Gergly for "Flavoring Product with Gradually Released Action and Procedures for Its Manufacture," published Mar. 4, 1981, claims delayed release of flavorants in chewing gum through incorporation of flavor essential oils, etc., in a matrix of at least one water insoluble material in which a softener has been embedded to delay release of the flavorant until a first flavorant has been dissipated from the mouth and yet to thereafter release the flavorant "in logarithmic proportions" after this delay. This process also results in substantial dissolution of the flavorant in the water insoluble matrix with intendent loss of available flavor due to problem of "chew-out".

Applicant's process, alone, has been successful in both giving time delayed release of flavorant combined with a burst of flavor and sustained release of substantially all of the originally added flavorant without problems of fixation of the flavorant in the water insoluble coating or gum base.

SUMMARY OF THE INVENTION

A method for preparing a solid, particulate delayed release encapsulation flavorant and the improved variable flavor chewable composition, e.g. chewing gums prepared therewith, wherein the flavorant is characterized by controlled, delayed release of substantially all of the initial encapsulated flavor over a substantial period of time while maintaining high flavor levels, comprising the steps of:

(a) preparing an aqueous emulsion of a flavorant in an at least partially hydrophilic encapsulation material comprising gelatin, a natural gum and plasticizer;

(b) drying said emulsion to produce a uniform solid matrix product having the flavorant containing substantially all of its water distillable components i.e. low boilers within a solid emulsion matrix of said encapsulation material;

(c) milling said dried solid matrix to a particle size of less than 20 mesh to produce solid powder; and (d) coating said solid powder with a water insoluble material selected from the group consisting of polyvinyl acetate, polyvinyl alcohol, zein, high Bloom gelatin having a Bloom of over 100 to 300 and ethylcellulose to produce an encapsulated flavorant having a relatively thin water-insoluble coating which delays release of flavorant under chewing and the hydrolytic condition of the mouth for a controlled period of time and yet which will thereafter release substantially all of its original flavor notes at desired flavor levels and over a sustained period of time without having significant amounts of flavorant dissolved in the water insoluble coating material.

The principal object of this invention is to provide a method for preparing an improved flavorant composition for controlled, delayed release of flavor in chewing gums at substantial flavor intensity levels with lower levels of flavor oil than that used in prior art gums and substantially no loss of flavor through dissolution into the gum base.

A further object of this invention is to provide a method for preparing a flavorant composition which gives controlled, delayed release and perceptibly high flavor intensity over a sustained period of chewing wherein substantially all of the initial flavor oil is released without being locked in or dissolved in the gum base, thereby allowing the use of substantially less flavor oil in the final chewing gum product.

A still further object of this invention is to provide an improved chewing gum and method for preparation thereof wherein the chewing gum has two or more distinctly perceptible flavors through use of one or more controlled, delayed release flavorant compositions with a conventional free oil or spray dried encapsulated flavorant.

These and other objects of this invention will become apparent from the following detailed description and preferred embodiment of the invention, which are meant to be illustrative of the invention.

DESCRIPTION

The encapsulation method for preparing the delayed release flavorant compsition of this invention involves a two-step procedure wherein a solid particular base powder is first prepared by encapsulating a flavor in a matrix of partially or slightly hydrophilic or water soluble encapsulation material which is then dried and ground then secondly coating the base powder with a water insoluble material which has an affinity for, but is insoluble in, the chewing gum bases to thereby prevent the flavor from diffusing out into the gum base and yet which, when fractured, allows the hydrolytic action of the mouth to convert the solid hydrophilic emulsion matrix to a liquid emulsion, wherein water is in the continuous phase, for releasing flavor at high levels of intensity with minimum flavor dissolution in the polyvinyl acetate coating or gum base. This encapsulation method thus prevents chew-out problems and provides highly perceptible flavor at substantially lower levels of flavor oil than conventional free oil or spray dried encapsulation flavorants.

In the process of the invention, a water insoluble flavoring, e.g. essential oils, is admixed with an aqueous encapsulation material comprising gelatin, gum arabic and a plasticizer to produce an aqueous emulsion wherein the water distillable, i.e. "low boiler" components of the flavorings are entrained in a matrix of the gelatin encapsulation material during subsequent drying, thereby retaining a substantial portion of the low boiler flavor notes. The resulting emulsion is dried, preferably in a thin layer or sheet, to give a solid emulsion which is ground into a solid base powder having a minimum outer surface area of encapsulation material to volume of encapsulated flavoring and a relatively high bulk density compared to prior art, hollow spray particulate flavorants.

This base powder, which like the spray dried flavorant disclosed in the U.S. Pat. No. 4,276,312 of one of the Co-Inventors, contains low boiler flavor notes such as acetaldehyde and butylacetate, can then optionally be coated with gum arabic or gelatin or hardened with a cross-linking agent to seal the matrix for purposes of both slowing down flavor release and preventing the flavor from being dissolved in the subsequently applied water insoluble coating material, e.g. polyvinyl acetate.

The water insoluble coating, which can be selected from materials such as polyvinyl acetate, polyvinyl alcohol, zein, high Bloom gelatin (i.e. above 100 Bloom) and ethylcellulose, is applied to the base powder in the form of either a solution in ethanol or an emulsion, by blending or spraying in a fluidized bed. Subsequent vacuum or air drying is used to remove solvent when a solution of polyvinyl acetate, etc., is used. The water insoluble coating both delays release of the flavor in the solid powder matrix and prevents the flavor from dissolving in the gum base, which would remove a substantial amount of the available flavor needed for acceptable flavor perception levels.

It is believed that the essential features of this invention are: (i) the core matrix which entraps and prevents loss of "low boiler" flavor notes during drying and yet which is partially hydrophilic to give quick and sustained release of flavor at interesting flavor peaks or burst; and (ii) the water insoluble coating which delays flavor release and prevents the flavor from dissolving, and thereby being indefinitely entrapped, in a chewing gum base. Though Applicants do not intend to be bound by any theory or proposed mechanism of operation, it is believed that these essential characteristics of the flavor compositions of this invention are obtained by using a core matrix, i.e. base powder of partially hydrophilic and slowly soluble material, which entraps the flavor and a coating material that is insoluble in, but has an affinity for, the chewing gum base, e.g. plasticized polyvinyl acetate, remains as a discontinuous phase "encapsulated" within the other components of the gum base. The polyvinyl acetate coated flavor always remains a part of the gum base, protecting the flavor from moisture, which might otherwise dissolve the core matrix and allow flavor to be released into the gum base components which would be lost or "fixed" in the gum base.

According to the general teaching of this invention, a dried, e.g. drum dried, solid base powder of flavor encapsulated in a solid matrix of partially hydrophilic material is prepared from the following formula:

|  | % By Weight |
| --- | --- |
| 100 Bloom Gelatin (90% T.S.) | 34.8 |
| Gum Arabic (91% T.S.) | 34.8 |
| Flavor Oil (e.g. Peppermint) | 25.0 |
| Glycerol (Plasticizer) | 6.0 |
| BHA | 0.2 | wherein 60 parts of the above formula are mixed with 40 parts water in a Hobart mixer. The water is first heated to 130° F. (54.4° C.) and the gum arabic is added and mixed until dissolved. The gylcerol and flavor oil are then added while mixing at high speed to emulsify the flavor oil, i.e. approximately 10 minutes. Mixing is then slowed during gelatin addition and then continued at high speed until the gelatin is dissolved.

The resulting liquid emulsion matrix is then dried, eg. roll dried using 12 psi. steam at 1.1 RPM and a drum gap of 0.020. The resulting dried sheet of solid matrix of encapsulated flavor oil is then milled to a mesh size of between 20-30 to give a solid base powder for secondary treatment or coating.

The base powder can then be made less water soluble by treatment with a cross-linking agent for the gelatin to seal the solid matrix for reduced rate of flavor release when the flavor is chewed and to avoid flavor migration and dissolution in the outer water insoluble material coating. The cross-linking agents are selected from the group consistng of glutaraldehyde, acetaldehyde, urea/formaldehyde and tannic acid, with glutaraldehyde being preferred for most flavor oils which are encapsulated by this process. The glutaraldehyde can be sprayed as a solution on a fluidized bed to seal the particle surface prior to secondary coating or can be simultaneously applied within an emulsion or solution of the secondary water insoluble coating. Another method, though less preferred, is to add the cross-linking agent to the wet emulsion matrix prior to roll drying.

A continuous coating or film of gum arabic or gelatin applied to the surface of the base powder has also been found to serve the function of giving a more insolubilized core matrix which will keep the flavor from migrating to the surface and dissolving or softening the water insoluble outer coating. This gum arabic or gelatin coating is in fact preferred in most instances due to the non-continuous nature of the gelatin matrix outer surface resulting from milling of the solid matrix sheets.

The use of cross-linking agents or continuous gum arabic or gelatin film is required when flavors such as spearmint or cinnamon are used due to the fact that these flavors are good solvents for the preferred polyvinyl acetate outer coating material and even small amounts of the flavor oil on the surface of the base powder matrix will dissolve the polyvinyl acetate water insoluble coating and thereby prevent delayed release and allow flavors to be enrolled in the gum base, with resulting problems of flavor "chew-out."

Unlike other flavors, peppermint oil does not readily dissolve polyvinyl acetate and therefore a base powder matrix containing peppermint oil can be effectively coated with polyvinyl acetate after cross-linking of the gelatin matrix surface even when some flavor oil migrates to the outer surface due to fracturing of gelatin in milling.

The treated base powder matrix is finally coated with a thin film of a water insoluble polymeric material selected from the group consisting of polyvinyl acetate, zein, polyvinyl alcohol, high Bloom gelatin (above 100 Bloom) and ethylcellulose, with polyvinyl acetate being preferred, to further seal in the flavor and to further insolubilize the encapsulated flavor for prolonged delayed release. The coating material, which must exhibit an affinity for but be insoluble in the chewing gum base, will resist being dissolved under the temperature and hydrolytic condition of the mouth and prevent migration of the flavor oil into the chewing gum base yet, when fractured, will allow the moisture of the mouth to contact the solid core emulsion matrix of the base powder and rapidly convert the matrix into a water soluble liquid emulsion wherein water is the continuous phase and will not dissolve into the chewing gum base in preference to release of flavor in the mouth.

The polymeric water insoluble coating materials can be applied from solution, e.g. in ethanol, or from emulsions. When applied from solutions, the solution can be sprayed on a fluidized bed of the base powder flavorant at a rate which will build a uniform film on the surface of the particles as the solvent is evaporated. Alternately, the solution can be mixed with the base powder in a blender, with subsequent removal of solvent under vacuum, air drying or having the wet material tumbled in a tunnel dryer.

The preferred method of applying the polymeric material, especially polyvinyl acetate, is through use of a food grade emulsion of the polyvinyl acetate in a fluidized bed. Emulsions have the advantage of eliminating the need for solvent recovery and allowing the use of higher molecular weight polymers than in solutions.

The process of this invention can be readily seen from the following detailed description of the Applicants' preferred embodiment of this invention. This embodiment, which is meant to be illustrative of a commercially practical process of this invention, is not to be construed as limiting upon the scope of Applicants' invention.

A one thousand pound (454.5 kg.) batch of spearmint delayed release encapsulated flavorant is prepared by pumping water (748 lb., 340 kg.) into a 250 gal. (940 l.) mixer and heating to 160° F. (71.1° C.). Gum arabic (372 lb., 169.1 kg.) is then added and mixed until uniform while maintaining the temperature at 160° F. (71.1° C.). Glycerol plasticizer (58.7 lb., 26.7 kg.) and 100 Bloom type B gelatin (372 lb., 169.1 kg.) are then mixed in until dissolved. Spearmint oil (266 lb., 120.9 kg.), containing 2 lb. (0.91 kg.) of BHA dissolved therein, is then added and mixing is continued until an emulsion is produced.

The liquid emulsion is then dried on a drum dryer at a drum temperature of 274° F. The gap between the rolls is 0.020 inches (0.051 cm.). The dry sheet product is run through a hammer mill and the milled product is sifted through a 20 mesh screen to produce a solid base powder containing a solid emulsion of flavor oil in the encapsulation matrix.

The base powder is then fluidized and sprayed with 61 lb. (27.7 kg.) of a 25% aqueous glutaraldehyde solution, using the following conditions:

| Inlet Temperature | 38° C. |
|---|---|
| Outlet Temperature | 30° C. |
| Spray Pressure (Bars) | 2.5 |
| Shaker Interval | 1.7/3 sec. |
| Feed Speed | 3 liters/min. |
| Outlet Flaps | 36 |

When complete, the bed fluidization is continued for 10 minutes at an inlet temperature of 50° C.

After 10 minutes, the fluidized base powder is sprayed with 178 lbs. (80.9 kg.) of a 30% aqueous emulsion of polyvinyl acetate using the same conditions used to spray the glutaraldehyde, with the exception that the feed speed is 5 liters/min.

After the polyvinyl acetate coating is completed, fluidization is continued for 10 minutes at a 50° C. inlet temperature. Five kilograms of sodium silico aluminate anti-caking agent is added and fluidization is continued for one minute. The final, free flowing solid delayed release product is then removed, and sifted through a 20 mesh screen.

The flavors used in the practice of this invention comprise primarily water insoluble essential oils, oleo resins, spices, and artificial flavorants. Representative flavorants, which are of course not all encompassing of flavors having utility in the process of this invention, include flavors conventionally used in chewing gums such as essential oils such as lemon, orange, cherry and other fruit oils, spearmint oil, peppermint oil and cinnamon. Where a sugarless gum is contemplated, artificial sweeteners such as aspartame may also be incorporated in the flavor oil which is encapsulated by the instant process to give a flavor which also has a desired sweetness.

The essential feature of this invention, namely the production of a delayed release flavorant which will release a substantial flavor burst after a 3-5 minute delay and maintain a sustained release of flavor at acceptable perception levels, even with substantially less flavoring than conventional free oils or spray-encapsulated flavorants, has been found to be affected by a number of process variables including the particle size of the solid base powder, the choice of particular flavor oil, the Bloom strength of the gelatin used in the base matrix emulsion as well as the use of other components in the matrix, such as maltodextrin, the amount of water insoluble material coating and the method of treating the outer surface of the base powder matrix to seal and insolubilize the outer surface of the base matrix, i.e. cross-linking agents and/or spraying of a thin film of gum arabic or gelatin. To the extent that the choice of flavorant and the desired release time and texture of the final gum product determine the required process conditions, these process conditions are critically interrelated.

The particle size of the base powder matrix and the final encapsulated product resulting from insolubilization of the outer surface of the base powder must ordinarily be maintained in the range of 20-30 mesh to avoid the undesired perception of large particles in the gum base, which, in turn, affects the texture and chewability of the chewing gum product. Apart from the size limitation on the final product, it has generally been found that smaller particle size results in slightly longer delay in flavor release. Applicants have thus found that the optimum particle size is therefore in the range of 20-30 mesh, but this can of course be varied within the skill of one in the art for the desired final product.

The use of thin film or drum drying for removing water from the aqueous emulsion to produce the solid hydrophilic base powder matrix of this invention has been found to be critical only in the sense that it produces a substantial solid particulate product, rather than the hollow product produced by conventional spray drying. Drying methods such as the improved spray drying of Co-Applicant's U.S. Pat. No. 4,276,312, which also produces substantially solid particulate products, can also be used in this invention. Hollow matrices have internal surfaces which cannot be effectively insolubilized and coated by the water insoluble coating of this invention and have been found to give substantially no delayed release when treated in accodance with the process of this invention, since flavor oil is immediately exposed to the hydrolytic condition of the mouth and/or dissolved in the chewing gum base, giving chewout problems conventionally known in the art.

The choice of the particular flavorant to be encapsulated by the process of this invention also affects the processing variables in that certain flavorants such as spearmint, cinnamon and the fruit oils are good solvents for polyvinyl acetate and will dissolve the polyvinyl acetate coating and migrate into and be entrained in the chewing gum base. These solvent flavors must be prevented from contacting the water insoluble coating to a greater degree than peppermint, which will not dissolve polyvinyl acetate or readily migrate into the gum base. Therefore, while a certain degree of peppermint flavor oil can be tolerated on the outer surface of the base powder matrix after milling, spearmint oil containing matrix should be coated with a thin film of gum arabic or gelatin of the base matrix, to achieve desired delayed release and yet maintain high water solubility of flavor after the water insolublized outer coating is fractured by chewing in the mouth.

The encapsulation material used to prepare the base powder matrix of this invention must be partially or slightly hydrophilic to achieve a flavor burst and sustained release of flavor without loss of flavor in the chewing gum base. The use of gelatin and gum arabic has therefore been found to be critical to the practice of this invention, and further has been found to allow retention of the desirable "low boiler" flavor notes by entraining the water distillable portion of the flavor oils and thereby protecting these low boilers from distillation during drum drying of the liquid emulsion to produce the solid emulsion matrix essential to the practice of this invention. The use of other water soluble matrix materials, such as maltodextrin, with gelatin and gum arabic, is also contemplated by this invention but is less preferred in that maltodextrin is less effective in forming a matrix which will retain low boilers under the heating conditions required for the drum drying of this invention.

The use of a plasticizer, such as glycerol, is essential for drum drying of the liquid emulsion according to the practice of this invention and is therefore an essential part of this invention. The use of other optional additions, such as conventional preservatives like BHA, is also contemplated by this invention.

The gelatin used in the matrix of this invention can generally be selected from gelatins having a Bloom of 100–300, with the lower Bloom strength being preferred from both an economic point of view and the fact that higher Blooms have a tendency to give hard, "crunch" textures which are unacceptable to manufacturers and consumers of chewing gums. Gelatins having a Bloom strength of 200 or more have been found to give significant delayed flavor release and good flavor intensity even when not cross-linked or coated with water insoluble material according to the practice of this invention, but the "sandy" or gritty texture imparted to the gum is not acceptable. Thus good flavor delayed release can be obtained through use of high Bloom gelatin according to the practice of this invention when the texture of the resulting product is not as critical as that in the case of chewing gum users.

The water insoluble coating materials of this invention are selected from film forming compounds with low water affinity and which are insoluble in the chewing gum base components. Though polyvinyl acetate is highly preferred for its already common acceptance in gum bases for increased chewability of otherwise "plastic" gum resin, other high molecular synthetic resins like polyvinyl alcohol and materials such as zein, ethylcellulose and high Bloom (over 100 Bloom) gelatin also have utility in the practice of this invention.

The water insoluble coating material has been found to be particularly effective in amounts of from 2.5 to 10.0% by weight of the final delayed release product. Amounts of insoluble coating, e.g., polyvinyl acetate, in excess of 10% by weight will also give delayed release, but the texture of the resulting encapsulated flavor was found to be unacceptably hard or "crunchy" when used in chewing gum and results in more sustained release of flavor, but at perceptibly lower flavor intensity peaks. The lower limits of the use of polyvinyl acetate coating are of course determined by the amount required to provide an effective coating for delayed release, since inadequate coating will result in having the partially hydrophilic or water soluble matrix exposed to the hydrolytic condition of the mouth and therefore fairly rapid flavor release without the desired 3–5 minute delay which allows use with other flavors in distinctly "double" flavored gums. Generally, the period of delay of flavor release increases with increased weight percent of insoluble coating material over the range of 2.5 to 10.0%, with less delay and higher flavor peaks noted at 2.5% and greater delay and sustained flavor release, at lesser flavor intensity being noted at the higher end of this range.

When polyvinyl acetate is used as the water insoluble coating, the molecular weight of the resin should be over 2000, as required by FDA regulations for use in gums and has been found to give better results at M.W. of over 14,000 to 40,000 when sprayed in solution and optimally upwards of 500,000, which can be obtained when emulsions of polyvinyl acetate are used for spray coating in fluidized beds. Emulsion of polyvinyl acetate should not, however, be highly polymerized due to the fact that highly polymerized coating, even at low weight percents, will result in delayed release and/or fixation of the flavor to such a degree that the flavor will not "chew-out" over an indefinite period of time.

The process and improved delayed release flavorant chewing gums of this invention are further shown by the following detailed examples, which are meant to be illustrative and not limiting upon the scope of Applicants' invention as subsequently defined in the claims.

EXAMPLES 1–4

Delayed release flavorant compositions of this invention were prepared according to the following formulations:

| Ingredients | Ex. 1 | Ex. 2 | Ex. 3 | Ex. 4 |
|---|---|---|---|---|
| 1. Gelatin (100 Bloom-Type B) | 50.0 | 15.0 | 21.0 | 27.4 |
| 2. Gum Arabic | 26.0 | 10.0 | 15.0 | 40.2 |
| 3. High Amylose Starch | — | 50.0 | 40.0 | — |
| 4. Native Spearmint Oil | 13.5 | — | — | 26.4 |
| 5. USP Peppermint Oil | — | 13.5 | — | — |
| 6. Cinnamic Aldehyde | — | — | 13.5 | — |
| 7. Sodium Saccharin | — | 1.5 | — | — |
| 8. Tannic Acid | 0.5 | — | — | — |
| 9. Glutaraldehyde | — | — | 0.5 | 1.0 |
| 10. Polyvinyl Acetate (Mol. Wt. 40,000) | 10.0 | 10.0 | 10.0 | — |
| 11. Polyvinyl Acetate (Mol. Wt. 500,000) | — | — | — | 5.0 |

In each of the above examples, the first seven numbered ingredients are admixed in accordance with the general procedure set forth above to give a liquid emulsion, which when drum dried and milled, gives the base powder matrix of this invention. In particular, approximately 60 parts of water is mixed with 40 parts of the above formulas (excluding polyvinyl acetate) in a planetary mixer wherein the water is first heated to 130° F. (54.4° C.), gum arabic is added and mixed until dissolved, followed by admixing of the flavor oil and starch, if any, at high speed to emulsify the flavor oil. Mixing is then slowed while gelatin is added and high speed mixing begins until the gelatin is dissolved. The sodium saccharin in Example 2 is added to the flavor oil prior to admixing with gum arabic and water.

The liquid emulsion is then roll dried under the conditions set forth above for the preferred embodiment of this invention and milled to a mesh size of 20–30 to give the base powder for secondary coating.

In Examples 1–3, the coating of the base powder with items 8 through 10 is performed by first preparing a polyvinyl acetate solution containing 30 parts polyvinyl acetate, 63 parts ethanol and 7 parts water, wherein the glutaraldehyde or tannic acid insolublizing or cross-linking agent is pre-dissolved.

The base powder is then mixed with the polyvinyl acetate solution in a ribbon type mixer and the mixture is allowed to run until the particulate product is free flowing, i.e. until the solvents are evaporated. Alternatively, the coated particles are placed on trays after five minutes mixing and the solvent is allowed to evaporate at room temperature or in a hot air oven (120° F., 48.9° C.) for four hours.

In Example 4, the base powder is first sprayed with a 25% solution of glutaraldehyde and then coated with a 30% emulsion of polyvinyl acetate while fluidized according to the preferred process described above. After coating, the coating, the coated solid matrix is mixed with a sodium silico aluminiate flow agent under fluidization for one minute to produce a solid particle, free flowing product which is sifted through a 20 mesh screen and stored for use in chewing gums.

The following examples illustrate a longer lasting flavor chewing gum (Example 5) and a chewing gum with a dual flavor, i.e. double flavor gum (Example 6) prepared using the delayed release flavorant prepared by the process of this invention. The chewing gum base is selected from conventionally available chewing gum bases and does not form a part of this invention. Similarly, the encapsulated flavor oils used with the delayed release flavorant are conventional and have been prepared by the process disclosed in Co-Applicant's U.S. Pat. No. 4,276,312.

EXAMPLES 5 AND 6

Chewing gums were prepared from the following formulas:

| | Example 5 - % by wt. | Example 6 - % by wt. |
|---|---|---|
| 10X Sugar | 58.85 | 58.85 |
| Conventional Gum Base ("Dreyco") | 20.50 | 20.50 |
| 44° Brix Corn Syrup | 14.50 | 14.50 |
| Delayed Release Spearmint (13.3% Oil) | 3.00 | — |
| Conventional Encapsulated Spearmint Oil (15% Oil) | 2.25 | — |
| Conventional Encapsulated Cherry (15% Oil) | — | 2.25 |
| Delayed Release Peppermint (13.5% Oil) | — | 3.00 |
| Corn Oil | 0.60 | 0.60 |
| Lecithin | 0.30 | 0.30 |

The gums were prepared by blending the gum base at 170° F. (76.7° C.) with lecithin, corn oil and delayed release flavor in a Baker-Perkins mixer for 3 minutes. The corn syrup and sugar are then added and mixed for 2 minutes. The conventional encapsulated flavor is then added and mixed for another 2 minutes. The resulting gum mass, which is now at a temperature of about 140° F. (60.0° C.) is then removed from the mixer, dusted with a very small amount of 10X sugar, rolled and scored into sticks of gum according to conventional processing techniques.

The gums prepared using the delayed release flavorant which contained less than 0.75% flavor, compared to normal gums containing 1.0% or more flavor, exhibited stronger and longer lasting flavor perception than conventional gums while giving two distinctly perceptible flavors in the case of Example 6.

EXAMPLES 7 AND 8

Delayed release flavorant compositions of this invention were also prepared from the following formulas:

| Ingredients | Example 7 | Example 8 |
|---|---|---|
| 1. Gelatin (100 Bloom-Type B) | 31.45 | 30.5 |
| 2. Gum Arabic | 31.85 | 35.3 |
| 3. Native Spearmint Oil | 25.0 | — |
| 4. USP Peppermint Oil | — | 19.3 |
| 5. Glycerol | 5.5 | 4.7 |
| 6. BHA | 0.2 | 0.2 |
| 7. Glutaraldehyde | 1.0 | — |
| 8. Gelatin (200 Bloom) | 5.0 | — |
| 9. ethylcellulose (10% Solution) | — | 10.0 |

The delayed release flavorant of example 7 was prepared by the same procedure described in example 4, above, with the exception that the Fluidized base powder was first coated with a 20% solution of 200 Bloom Gelatin and then sprayed with 25% solution of glutaraldehyde to cross-link the high Bloom gelatin water-insoluble coating.

The delayed release flavorant of example 8 was prepared according to the procedure set forth in examples 1–3, above.

Though the high Bloom gelatin (example 7) and ethylcellulose (example 8) coated flavorants did not achieve the same degree of delayed or delayed flavor release as that obtained with polyvinyl acetate (i.e., 3–5 minutes delay) both gave acceptable flavor release at about 2 minutes delay and extended flavor release up to about 5–6 minutes chewing time.

While the above examples are for sugar gums, the same flavor systems work equally well with sugarless gums wherein artificial sweeteners such as aspartame can be mixed with the flavor oil prior to delayed release encapsulation.

The delayed release flavorants of this invention have thus made it possible to prepare a single piece of chewing gum with two distinct, e.g. a conventional encapsulated cherry flavor which can be tasted for approximately the first 3 minutes of chewing and thereafter a delayed release peppermint flavor which becomes perceptible after approximately 3 minutes and reaches a flavor peak at 4–5 minutes and a sustained release for 8–10 minutes of chewing.

Moreover, chewing gums presently on the market have the following problems: (1) 1.0% or more of expensive flavor oil is required to obtain acceptable initial flavor perception (10 times that required in other confections) due to the fact that flavor oils have a great affinity for the chewing gum base and become locked in and not perceptible, as shown by analysis of cud after 4 hours of chewing wherein 80% of the added flavor still remains; and (2) even at 1.0% or more flavor oil levels, acceptable perception levels last only about 2–3 minutes. Both of these deficiencies have been substantially overcome by chewing gums prepared with the delayed release flavorants of this invention, which reach even higher flavor levels and maintain highly perceptible flavor over a period of 3–6 or even 8 minutes of chewing and which are highly compatible with spray encapsulated flavors having moderately high perception levels (but not as high as the delayed release flavorant) over 1–2 minutes of chewing.

In summary, it is the essential feature of this invention to provide a method for preparing a solid matrix of water insoluble flavors containing low boiler flavor notes in a partially hydrophilic solid emulsion of encapsulating material which is treated, i.e. coated with a cross-linking agent or thin coating of gelatin or gum arabic and a coating of water insoluble material to insolubilize the outer surface of the flavor matrix wherein the insolubilized outer coating delays release of flavorant in the mouth or migration of flavor into the gum base until fractured and thereafter the hydrolytic condition of the mouth converts the solid emulsion matrix to a liquid emulsion where water is in the continuous phase for rapid and sustained release of a substantial flavor "burst" and yet the physical state of the liquid emulsion prevents the flavor from being dissolved in the water insoluble coating or chewing gum base and thereby prevents the fixation of flavor in the base which results in flavor "chew-out" problems and the use of excessive amounts of flavor to achieve acceptable consumer flavor perception levels.

Applicants having disclosed their invention, obvious modifications will become apparent to those skilled in the related art. Applicants therefore intend to be limited only by the scope of the appended claims.

We claim:

1. A method for preparing a delayed release solid encapsulated flavorant composition for use in chewable compositions characterized by delayed controlled release of substantially all the active encapsulated flavorant after a significant period of chewing, i.e. after approximately 2-3 minutes or more chewing, comprising the steps of:
   (a) preparing an aqueous emulsion of a flavorant which comprises water distillable components in an at least partially hydrophilic encapsulation material comprising gelatin, a natural gum and plasticizer;
   (b) drying said emulsion to produce a uniform solid matrix product having the flavorant containing substantially all of its water distillable components i.e. low boilers within a solid emulsion matrix of said encapsulation material;
   (c) milling said dried solid matrix to a particle size of less than 20 mesh to produce solid powder; and
   (d) coating said solid power with a water insoluable material selected from the group consisting of polyvinyl acetate, polyvinyl alcohol, zein, high Bloom gelatin having a Bloom of over 100 to 300 and ethylcellulose to produce an encapsulated flavorant having a relatively thin water insoluble coating which delays release of flavorant under chewing and the hydrolytic condition of the mouth for a controlled period of time and yet which thereafter release substantially all of its original flavor notes at desired flavor levels and over a sustained period of time without having significant amounts of flavorant dissolved in the water insoluble coating material.

2. The method of claim 1 wherein the active ingredient is selected from the group consisting of essential oils, oleo resins, imitation flavors, fragrances and mixtures thereof.

3. The method of claim 1 wherein the drying in (b) is performed in a drum dryer.

4. The process of claim 1 wherein coating is from 2.5 to 10% by weight and the delayed release is from 3-10 minutes after initial chewing of a gum containing said delayed release encapsulated flavorant.

5. The process of claim 1 wherein the milled powder of (c) is treated with an aqueous solution of a cross-linking agent selected from the group consisting of glutaraldehyde and tannic acid.

6. The process of claim 5 wherein the cross-linking agent is glutaraldehyde.

7. The process of claim 1 wherein the powder of (c) is treated with an aqueous solution of gum arabic to further seal the powder prior to coating with the water insoluble material in step (d).

8. The process of claim 1 wherein the base powder of (c) is treated with a thin coating of gelatin to further seal the powder prior to coating with the water insoluble material in step (d).

9. The process of claim 6 wherein the glutaraldehyde is added to an emulsion of the water insoluble material prior to coating.

10. The process of claim 9 wherein a glutaraldehyde and polyvinyl acetate emulsion is sprayed on the base powder in a fluidized bed.

11. The process of claim 1 wherein the gelatin in step (a) is a gelatin having a Bloom of from 100-300.

12. The method of claim 1 wherein the water insoluble material is polyvinyl acetate and is present in the amount of 2.5-10.0% by weight of the overall final flavor product.

13. The method of claim 12 wherein the polyvinyl acetate is applied in the form of an emulsion which is sprayed on the encapsulated flavorant base powder in a fluidized bed.

14. The method of claim 13 further including the stop of contacting the encapsulated matrix base powder of (c) with an aqueous solution of glutaraldehyde to crosslink the surface of the matrix and thereby provide a sealed particle for slower release and better subsequent coating with polyvinyl acetate in step (d).

15. The method of claim 14 wherein the matrix is coated with an aqueous solution of gum arabic to seal the base powder for slower release and better subsequent coating with polyvinyl acetate.

16. An improved chewing gum composition having one or more flavorants with controlled delayed flavor release characteristics comprising a chewing gum base and one or more flavorant agents which have been encapsulated by the method of claim 1.

17. The chewing gum composition of claim 16 further including at least one additional flavorant in conventionally available form.

18. The chewing gum composition of claim 17 wherein the additional flavorant is a spray dried encapsulated flavorant oil.

19. An improved chewing gum composition having one or more flavorants with controlled delayed flavor release comprising a chewing gum base and one or more flavorant agents which have been encapsulated by the method of claim 12.

20. The chewing gum composition of claim 19 further including at least one additional flavorant in conventionally available form.

21. The chewing gum composition of claim 20 wherein the additional flavorant is a spray dried encapsulated flavorant oil.

22. An improved chewing gum composition having one or more flavorants with controlled delayed flavor release comprising a chewing gum base and one or more flavorant agents which have been encapsulated by the method of claim 14.

23. The chewing gum composition of claim 22 further including at least one additional flavorant in conventionally available form.

24. The chewing gum composition of claim 23 wherein the additional flavorant is a spray dried encapsulated flavor oil.

25. An improved chewing gum composition having one or more flavorants with controlled delayed flavor release comprising a chewing gum base and one or more flavorant agents which have been encapsulated by the method of claim 15.

26. The chewing gum composition of claim 25 further including at least one additional flavorant in conventionally available form.

27. The chewing gum composition of claim 26 wherein the additional flavorant is a spray dried encapsulated flavor oil.

* * * * *